US012489709B2

(12) United States Patent
Zhan et al.

(10) Patent No.: US 12,489,709 B2
(45) Date of Patent: Dec. 2, 2025

(54) ACCESS TRAFFIC LIMITING METHOD AND APPARATUS, DEVICE, STORAGE MEDIUM, AND COMPUTER PROGRAM PRODUCT

(71) Applicants: COSMO DIGITAL TECHNOLOGY (QINGDAO) CO., LTD., Shandong (CN); COSMO INSTITUTE OF INDUSTRIAL INTELLIGENCE (QINGDAO) CO., LTD., Qingdao (CN); COSMO IOT TECHNOLOGY CO., LTD., Qingdao (CN)

(72) Inventors: Bo Zhan, Shandong (CN); Yong Wang, Shandong (CN); Mizhen Wang, Shandong (CN)

(73) Assignees: COSMO DIGITAL TECHNOLOGY (QINGDAO) CO., LTD., Shandong (CN); COSMO INSTITUTE OF INDUSTRIAL INTELLIGENCE (QINGDAO) CO., LTD., Qingdao (CN); COSMO IOT TECHNOLOGY CO., LTD., Qingdao (CN)

( * ) Notice: Subject to any disclaimer, the term of this patent is extended or adjusted under 35 U.S.C. 154(b) by 301 days.

(21) Appl. No.: 18/233,197

(22) Filed: Aug. 11, 2023

(65) Prior Publication Data
US 2023/0388235 A1 Nov. 30, 2023

Related U.S. Application Data

(63) Continuation of application No. PCT/CN2022/117590, filed on Sep. 7, 2022.

(30) Foreign Application Priority Data

Sep. 9, 2021 (CN) .......................... 202111056431.6

(51) Int. Cl.
*H04L 47/12* (2022.01)
*H04L 47/20* (2022.01)

(52) U.S. Cl.
CPC ............. *H04L 47/12* (2013.01); *H04L 47/20* (2013.01)

(58) Field of Classification Search
CPC ................................ H04L 47/12; H04L 47/20
See application file for complete search history.

(56) References Cited

U.S. PATENT DOCUMENTS 10,782,650 B1 * 9/2020 Bitner ..................... G06F 17/18
2010/0042734 A1 * 2/2010 Olafsson ................. H04W 4/02
709/229

(Continued)

FOREIGN PATENT DOCUMENTS

CN 104978335 A 10/2015
CN 105282047 A 1/2016

(Continued)

OTHER PUBLICATIONS

First Office Action issued in related Chinese Application No. 202111056431.6, on Jan. 4, 2023, in 9 pages.

(Continued)

*Primary Examiner* — Emmanuel L Moise
*Assistant Examiner* — Robert A Shaw
(74) *Attorney, Agent, or Firm* — Davis Wright Tremaine LLP

(57) ABSTRACT

The present application provides an access traffic limiting method and apparatus, a device, a storage medium, and a computer program product. The method includes: when detecting that the number of access requests transmitted by a plurality of terminal devices to an access interface exceeds a first preset value, intercepting for each individual terminal device, outside the access interface, a target access request (Continued)

transmitted by the terminal device; determining the number of times that the target access request is received within a preset time period; and transmitting the target access request to the access interface if the number of times is greater than a second preset value. According to the present application, the success rate of interface accessing by a user can be improved.

7 Claims, 4 Drawing Sheets

(56) References Cited

U.S. PATENT DOCUMENTS

| | | | | |
|---|---|---|---|---|
| 2011/0153724 | A1* | 6/2011 | Raja | H04L 67/1001 |
| | | | | 709/223 |
| 2016/0357688 | A1* | 12/2016 | Brittain | G06F 12/1441 |
| 2018/0278678 | A1* | 9/2018 | Weng | H04L 63/0236 |
| 2020/0351207 | A1* | 11/2020 | Ye | H04L 47/781 |
| 2022/0129186 | A1* | 4/2022 | Kim | G06F 13/1668 |
| 2023/0057068 | A1* | 2/2023 | Bhandarkar | H04L 43/16 |
| 2023/0353572 | A1* | 11/2023 | Griffin | H04L 63/101 |

FOREIGN PATENT DOCUMENTS

| | | | | | |
|---|---|---|---|---|---|
| CN | 105763561 | A | | 7/2016 | |
| CN | 107436835 | A | | 12/2017 | |
| CN | 108683604 | A | | 10/2018 | |
| CN | 109257293 | A | | 1/2019 | |
| CN | 110535777 | A | * | 12/2019 | ............ H04L 47/10 |
| CN | 110808914 | A | | 2/2020 | |
| CN | 111625859 | A | | 9/2020 | |
| CN | 111949979 | A | | 11/2020 | |
| CN | 112099979 | A | | 12/2020 | |
| CN | 112367269 | A | | 2/2021 | |
| CN | 112579396 | A | | 3/2021 | |
| CN | 112615792 | A | | 4/2021 | |
| CN | 113285883 | A | * | 8/2021 | ............ H04L 47/20 |
| CN | 113726683 | A | | 11/2021 | |
| CN | 115086234 | A | * | 9/2022 | ............ H04L 47/50 |
| CN | 111352967 | B | * | 2/2024 | ......... G06F 16/2462 |
| WO | 2018088680 | A1 | | 5/2018 | |

OTHER PUBLICATIONS

International Search Report issued in related International Application No. PCT/CN2022/117590, mailed on Nov. 30, 2022, in 15 pages.

Notification of Grant issued in related Chinese Application No. 202111056431.6, on May 22, 2023, in 7 pages.

* cited by examiner

ACCESS TRAFFIC LIMITING METHOD AND APPARATUS, DEVICE, STORAGE MEDIUM, AND COMPUTER PROGRAM PRODUCT

CROSS-REFERENCE TO RELATED APPLICATION

This application is a continuation of International Application No. PCT/CN2022/117590, filed on Sep. 7, 2022, which claims priority to Chinese Patent Application No. 202111056431.6, filed on Sep. 9, 2021 and entitled "Access Traffic Limiting Method and Apparatus, Device, Storage Medium, and Computer Program Product." The disclosures of the aforementioned applications are incorporated herein by reference in their entireties.

TECHNICAL FIELD

The present application relates to communication technology and, in particular, to an access traffic limiting method and apparatus, a device, a storage medium, and a computer program product.

BACKGROUND

In internet applications, burst traffic peaks might occur frequently. However, since any system has an upper limit in terms of its processing capacity, queuing is usually prone to arousing when request volume exceeds the processing capacity of the system, thereby resulting in a rapid increase in response time. If there is no constraint on the amount of resources occupied by a service, the system will probably crash due to excessive occupation of resources. In order to ensure a stable operation of the system when confronted with burst requests, a commonly used approach in the industry includes caching, traffic limiting, or degrading. Among them, the traffic limiting is a way to carry out denial of service, queuing or waiting, degrading, and other processing when request traffic exceeds bottleneck of the system.

Existing traffic limiting components of network requests are all about forward traffic-limiting, that is, the traffic limiting starts when the traffic exceeds a certain number, thereby rate-limiting is performed on concurrent requests within a time window so as to protect a communication system. However, in the above-described method, since all requests will be rate-limited during this time window, the success rate of interface accessing by a user is relatively low.

SUMMARY

The present application provides an access traffic limiting method and apparatus, a device, a storage medium and a computer program product, according to which the success rate of access interfacing by a user can be improved while ensuring stable operation of a system.

In a first aspect, an embodiment of the present application provides an access traffic limiting method, including:
  when detecting that the number of access requests transmitted by a plurality of terminal devices to an access interface exceeds a first preset value, intercepting for each individual terminal device, outside the access interface, a target access request transmitted by the terminal device;
  determining the number of times that the target access request is received within a preset time period; and
  transmitting the target access request to the access interface if the number of times is greater than a second preset value.

In a possible implementation, the determining the number of times that the target access request is received within the preset time period includes:
  determining whether the target access request is a non-first-access request to the access interface; and
  determining the number of times that the target access request is received within the preset time period if the target access request is the non-first-access request to the access interface.

In a possible implementation, the method further includes:
  transmitting the target access request to the access interface if the target access request is a first-access request to the access interface.

In a possible implementation, the method further includes:
  prohibiting the access interface from receiving the target access request if the number of times is not greater than the second preset value.

In a possible implementation, after transmitting the target access request to the access interface, the method further includes:
  updating the number of times that the target access request is received.

In a possible implementation, the intercepting, outside the access interface, the target access request transmitted by the terminal device includes:
  acquiring interface configuration information of the access interface;
  determining whether the interface configuration information includes traffic-limiting configuration information; and
  intercepting the target access request outside the access interface if the interface configuration information includes the traffic-limiting configuration information.

In a second aspect, an embodiment of the present application provides an access traffic limiting apparatus, including:
  an intercepting module, configured to, when detecting that the number of access requests transmitted by a plurality of terminal devices to an access interface exceeds a first preset value, intercept for each individual terminal device, outside the access interface, a target access request transmitted by the terminal device;
  a determining module, configured to determine the number of times that the target access request is received within a preset time period; and
  a transmitting module, configured to, transmit the target access request to the access interface when the number of times is greater than a second preset value.

In a possible implementation, the determining module is specifically configured to:
  determine whether the target access request is a non-first-access request to the access interface; and
  determine the number of times that the target access request is received within the preset time period if the target access request is the non-first-access request to the access interface.

In a possible implementation, the transmitting module is further configured to:
  transmit the target access request to the access interface if the target access request is a first-access request to the access interface.

In a possible implementation, the apparatus further includes: a processing module;
where the processing module is configured to prohibit the access interface from receiving the target access request when the number of times is not greater than the second preset value.

In a possible implementation, the apparatus further includes: an updating module;
where the updating module is configured to update the number of times that the target access request is received.

In a possible implementation, the intercepting module is specifically configured to:
acquire interface configuration information of the access interface;
determine whether the interface configuration information includes traffic-limiting configuration information; and
intercept the target access request outside the access interface if the interface configuration information includes the traffic-limiting configuration information.

In a third aspect, an embodiment of the present application further provides a server. The server may include: a memory and a processor;
where the memory is configured to store a computer program; and
the processor is configured to read the computer program stored in the memory and execute the access traffic limiting method according to any possible implementation of the first aspect based on the computer program in the memory.

In a fourth aspect, an embodiment of the present application further provides a computer-readable storage medium in which a computer-executable instruction is stored, where the computer-executable instruction, when being executed by a processor, implements the access traffic limiting method according to any possible implementation of the first aspect implemented.

In a fifth aspect, an embodiment of the present application further provides a computer program product, including: a computer program which, when executed by a processor, implements the access traffic limiting method according to any possible implementation of the first aspect.

The access traffic limiting method and apparatus, the device, the storage medium and the computer program product provided in the embodiments of the present application allow for: when detecting that the number of access requests transmitted by a plurality of terminal devices to an access interface exceeds a first preset value, intercepting for each individual terminal device, outside the access interface, a target access request transmitted by the terminal device; then determining the number of times that the target access request is received within a preset time period; and transmitting the target access request to the access interface if the number of times is greater than a second preset value. In a scenario of a large number of concurrent access requests, a traffic limiting component will be provided outside the access interface for each individual terminal device, and the target access request transmitted by the terminal device will be intercepted by the traffic limiting method. If the number of times that the target access request is received within the preset time exceeds the second preset value, it indicates that a user is in an urgent need to access the access interface; at this point, the traffic limiting component will release the access request to call the access interface. In this way, the system can be prevented from denying all access requests by enabling traffic limiting due to frequent transmission of an access request from an individual, thereby improving the success rate of accessing by the user under the premise of stable operation of the system.

BRIEF DESCRIPTION OF DRAWINGS

The accompanying drawings herein are incorporated into the specification and constitute a part of the specification, which illustrate embodiments consistent with the present application and are used to explain principles of the present application together with the specification. The accompanying drawings are described as follows.

Figure 1:
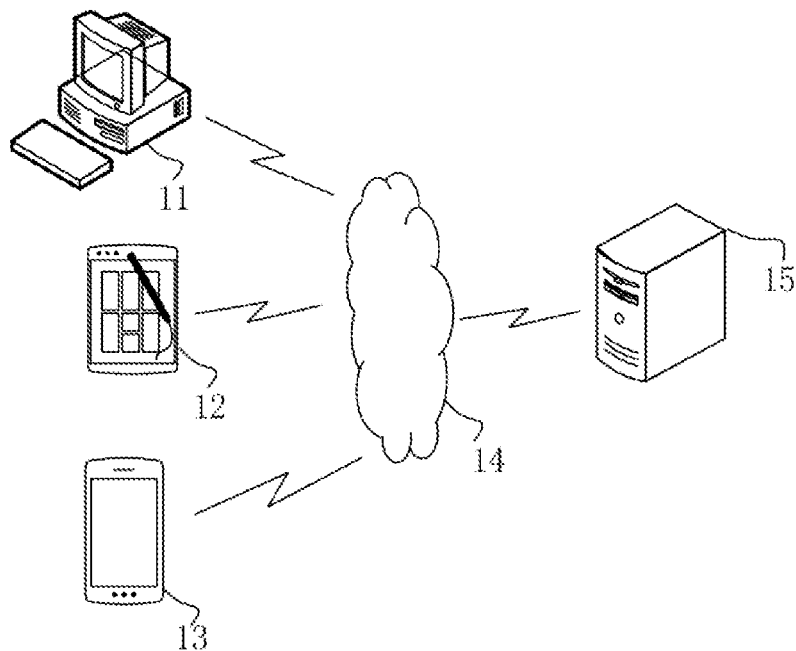
FIG. 1 is an architecture diagram of a system for an access traffic limiting method according to an embodiment of the present application.

Throughout the foregoing drawings, specific embodiments of the present application have been shown, and more detailed description will be given hereinafter. These drawings and text description are not intended to limit the scope of the idea of the present application in any way, but to illustrate concepts of the present application to persons skilled in the art with reference to the specific embodiments.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless otherwise indicated. Implementations described in the following exemplary embodiments do not represent all implementations consistent with the present application. Instead, they are merely examples of apparatuses and methods that are consistent with some aspects of the present application as detailed in the appended claims.

In order to help those skilled in the art better understand the technical solution of the present application, the relevant content involved in the technical solution of the present application will be introduced hereunder.

Traffic limiting refers to limiting the rate of data traffic. It is such a network traffic management technology of a computer network that some or all data packets are delayed to make them comply with a network traffic rule required by users.

Traffic limiting components refer to components containing a certain traffic limiting method or rule to limit the frequency of interface access so as to reduce the pressure on the server.

The access traffic limiting method according to the embodiment of the present application can be applied to a scenario in which it is necessary to perform traffic limiting for a high-concurrency service system in encountering a large number of frequent requests. In the high-concurrency scenario, concurrent requests within a time window can be rate-limited by means of the traffic limiting so as to achieve the purpose of protecting the system.

Existing traffic limiting methods mainly include a leaky bucket method, a token bucket method, a counter method and a sliding window method. Among them, it is assumed in the leaky bucket method that the server's ability to process requests is a bucket, and when a request arrives, the request is first put into the bucket, then the request is processed by the server in such a manner that it is fetched from the bucket at a fixed rate for corresponding processing. If the bucket is full, that is, reaching the processing capacity of the server, then a denial of service will be made for a newly arrived request. When confronted with burst traffic, the leaky bucket algorithm is prone to a problem of a large number of failed requests. The token bucket method is to add tokens to the bucket at a constant speed, and no more tokens will be added when the bucket is full. The server, when receiving a request, attempts to fetch a token from the bucket, and proceeds with subsequent service logic if the token is obtainable. It directly returns an error code or page indicating that the access frequency exceeds the limit and stops execution of subsequent service logic if the token is unobtainable. The counter algorithm has an idea of counting requests within a fixed time window, determining whether traffic limiting is necessary upon a comparison with a threshold, and clearing the counter to zero once a time temporal critical point is reached; in this case, there is a "time temporal critical point" defect, resulting in that the system collapses due to occurrence of instantaneous doubled traffic. The sliding window method achieves traffic limiting by dividing a large time window into a plurality of small windows, sliding the large window backward by a small window each time, and ensuring that the traffic within the large window will not surpass a maximum value.

However, regardless of whichever traffic limiting method described above, the traffic limiting starts after the number of access requests exceeds the processing capacity of the server, and during the traffic limiting process, the server will refuse to receive all access requests transmitted by all users, resulting in a low success rate of service interface accessing by the users so that there will be poor user experience.

With an example where a user needs to check logistics status information in an order list of a shopping application (APP) over a shopping system, when the user accesses his/her order list through a terminal device, the terminal device will call a third-party logistics interface to refresh logistic status, if the logistics tracking number has been added to an order while the background has not gotten a refresh of the logistics status of the order. In this process, when the user makes frequent accesses, the access request transmitted will be restricted by the third-party interface, and access requests issued by all users will be denied from service for a period of time subsequently, so that the logistics status of all users cannot be queried and refreshed, resulting in a low success rate of service interface accessing by the users, and bringing the users with poor user experience. In light of this, embodiments of the present application propose an access traffic limiting method and apparatus, a device, a storage medium, and a computer program product.

An embodiment of the present application provides an access traffic limiting method. In the method, when a plurality of users use terminal devices to issue access requests to an access interface concurrently, traffic limiting will be performed for each individual terminal device's access request. The number of times a target access request is received within a sliding window for a preset time period counted, and calling to the access interface is allowed when the number of times is greater than the preset value that is set, otherwise access traffic limiting is performed.

In this way, it is possible to make up for deficiencies of leaky and token buckets in the related arts, which can resist the impact of a large number of access requests in a short period of time. Traffic limiting is performed on the access request through the number of times the access request within a preset time period, thereby providing a stable and efficient traffic control for access requests in the network and improving a success rate of interface accessing by a user.

FIG. 1 is an architecture diagram of a system for an access traffic limiting method according to an embodiment of the present application. As shown in FIG. 1, the system includes a terminal device 11, a terminal device 12, a terminal device 13 and a server 15. A network 14 provides a communication link medium between the terminal device 11 or the terminal device 12 or the terminal device 13 and the server 15. Users may use the terminal device 11, the terminal device 12 and the terminal device 13 to interact with the server 15 through the network 14 so as to receive or transmit messages, etc.

Exemplarily, a user may use the terminal device 11, the terminal device 12 or the terminal device 13 to log in to an application operation interface thereon, to transmit various instructions or information to each terminal device, and each terminal device transmits an access request to the server 15 based on the instructions or information transmitted by the user.

If the number of access requests transmitted by the terminal device 11, the terminal device 12 or the terminal device 13 that are simultaneously received by the server 15 within a preset time period exceeds a first preset value, the server 15 will intercept an access request transmitted by each terminal device before the access request is transmitted to an access interface. After the interception, the server 15 will determine the number of times the access request transmitted by each terminal device is received within the preset time period. Assuming that the number of times the terminal device 11 transmits the access request exceeds a second preset value, it means that the user corresponding to the terminal device 11 has a very urgent need to access the access interface, at this point, a target access request will be transmitted to the access interface. Moreover, the server will intercept the access request transmitted by the terminal device of which the number of access requests does not exceed the second preset value, thereby achieving the purpose of traffic limiting.

It should be understood that the number of the user, the terminal device 11, the terminal device 12, the terminal device 13, the network 14 and the server 15 in the above system architecture are only exemplary, and a number greater than or less than that number also falls within the scope of protection of the present application. Further, in the above-described system, the terminal device 11, the terminal device 12 or the terminal device 13, for example, may be a personal computer, a server, a tablet, a mobile phone, a PDA, a notebook or any other computing device having a networking function. The server 15 may be implemented with a server or a group of servers with more powerful processing power and higher security. The network 14 used between them may include various types of wired and wireless networks, such as but not limited to: Internet, a local area network, WIFI, WLAN, a cellular communication network (GPRS, CDMA, a 2G/3G/4G/5G cellular network), a satellite communication network and so on.

Specific embodiments will be used hereunder to give detailed description to the technical solution of the present application and how the technical solution of the present application solves the above-described technical problem. The following specific embodiments may be combined with each other, and for the same or similar concepts or processes, repeated description will be omitted in certain embodiments. The embodiments of the present application will be described hereunder in conjunction with the accompanying drawings.

Figure 2:
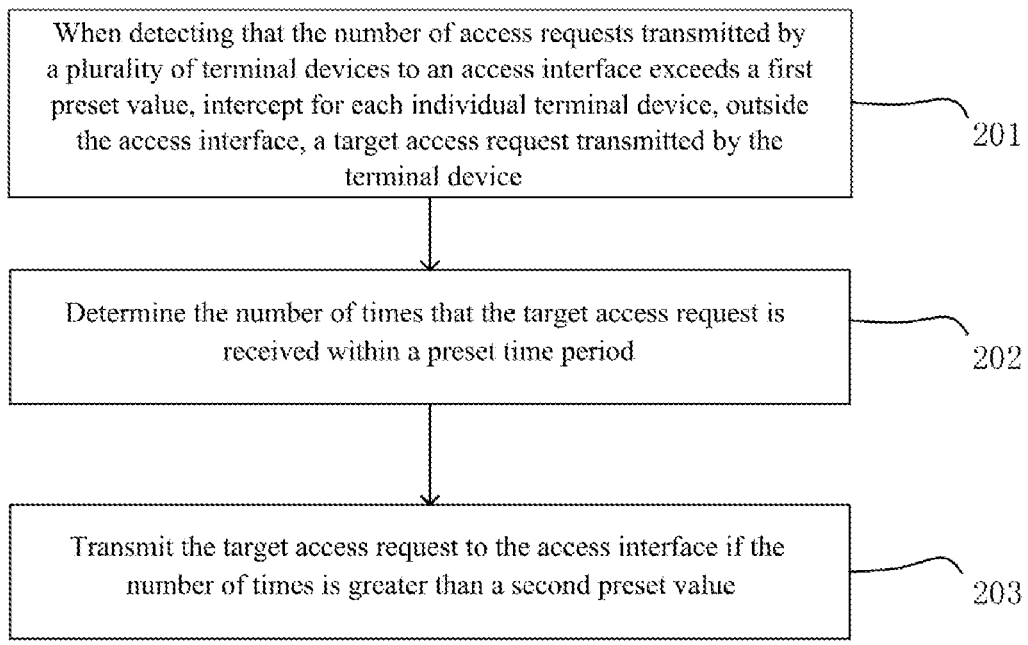
FIG. 2 is a flowchart of an access traffic limiting method according to an embodiment of the present application.

FIG. 2 is a flowchart of an access traffic limiting method according to an embodiment of the present application. The embodiment of the present application provides an access traffic limiting method which can be performed by any apparatus performing the access traffic limiting method, and the apparatus may be implemented by software and/or hardware. In the present embodiment, the apparatus may be integrated in the server 15 as shown in FIG. 1. As shown in FIG. 2, the access traffic limiting method provided in the embodiment of the present application includes the following steps.

Step 201: when detecting that the number of access requests transmitted by a plurality of terminal devices to an access interface exceeds a first preset value, intercept for each individual terminal device, outside the access interface, a target access request transmitted by the terminal device.

In the present embodiment, if a plurality of terminal devices simultaneously transmit access requests to the access interface within a preset time period, that is, when the number of access requests transmitted by the plurality of terminal devices to the access interface exceeds the first preset value, in order to prevent the system from collapsing, a traffic limiting operation is generally required at this time. The first preset value can be set according to the number of access requests that the server can handle, and for a specific value of the first preset value, the embodiment of the present application does not impose any limitation herein.

For each individual terminal device, the server will intercept a target access request transmitted by the terminal device before the target access request is transmitted to the access interface. The interception typically uses an added traffic limiting method or rule to block direct calling of the access interface for a newly generated access request.

Figure 3:
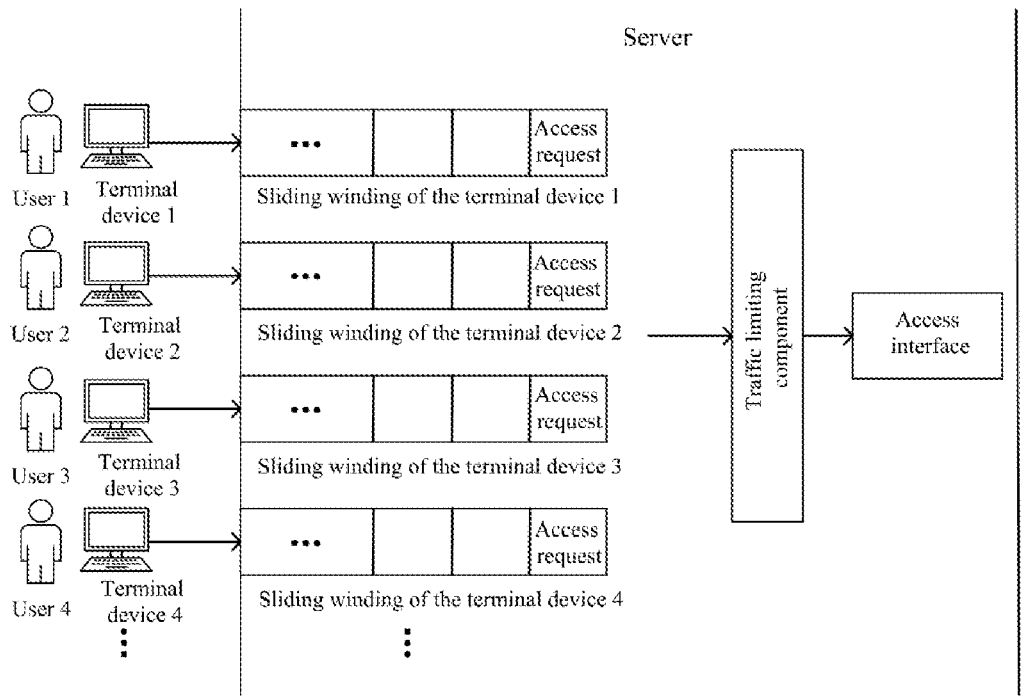
FIG. 3 is a schematic diagram of a process in which a server intercepts a target access request outside an access interface.

Specifically, when the user calls the access interface through the access request transmitted by the terminal device, the server will receive a target access request transmitted by the terminal device and intercept, outside the access interface, the target access request. FIG. 3 is a schematic diagram illustrating that a server intercepts a target access request outside an access interface. As shown in FIG. 3, when the server simultaneously receives access requests transmitted by a plurality of users using terminal devices, the server will create an isolative sliding window for each individual terminal device with a different id. At the same time, the access request within the sliding window will pass through a traffic limiting component, and the traffic limiting component will determine, according to the access traffic limiting method and rule inside, whether to release the target access request to call the access interface. The traffic limiting component contains the set access traffic limiting method and rule.

The sliding window refers to dividing a segment of time window into a plurality of cells at an equal time interval, maintaining a respective counter in each cell, and moving backward by a cell per one cell of time.

The isolative sliding window means that each individual terminal device with a different id contains an independently separate sliding window, that is, preventing the sliding window of that terminal device with the id being occupied since sliding windows of a terminal device with another id is consumed in their entireties. Each sliding window stores therein the access request, transmitted by the terminal device, received by the server, and the number of access requests acceptable in the sliding window is certain, for example, one time window is 60 s.

Figure 4:
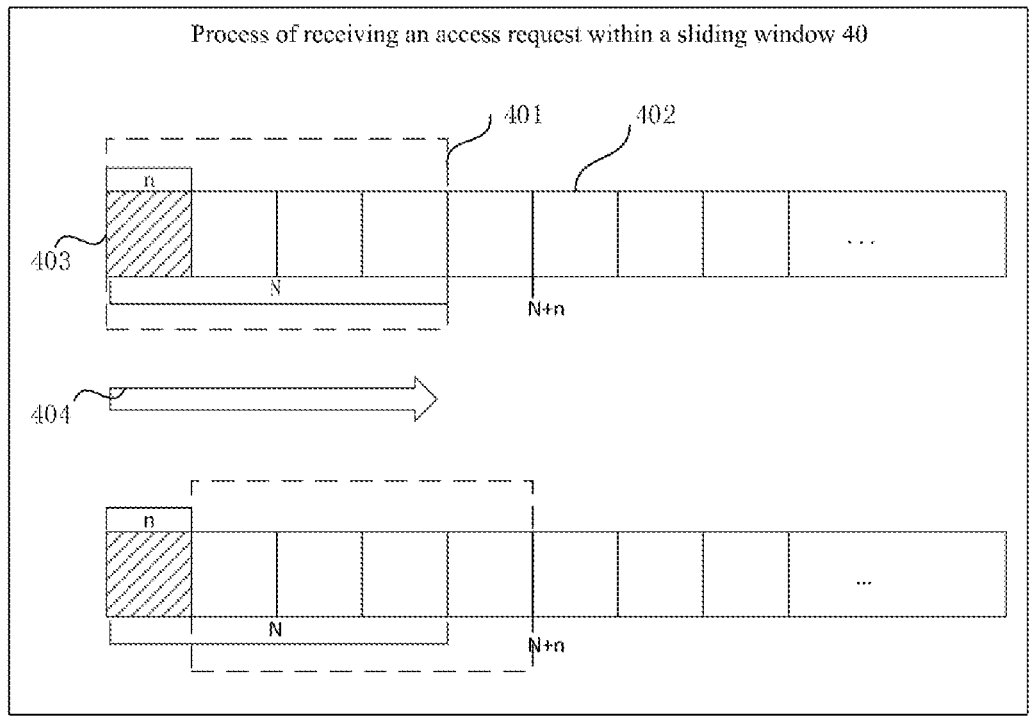
FIG. 4 is a schematic diagram of a process of receiving an access request through a sliding window according to an embodiment of the present application.

The access request received by the server is stored in the sliding window shown in FIG. 3. In order to have an in-depth understanding of the process of receiving an access request in a sliding window, the process of receiving an access request in a sliding window shown in FIG. 3 will be described in conjunction with the embodiment shown in FIG. 4.

In some specific embodiments of the present application, a segment of time window is provided, in general, the segment of time window is divided into time period at an equal time intervals, and the sliding window has the same length as the length of the segment of time window, and during this segment of time window, the number of access requests to the access interface may not exceed a threshold for the server to process requests. For example, in a process 40 of receiving an access request within a sliding window in FIG. 4, the dotted box 401 represents one sliding window, one solid box 402 represents one small time unit, the small time unit 403 filled with slash lines represents that an access request is received in this time unit, and an arrow 404 represents the direction at which the sliding window moves. A segment of time window has a time length of N, and the segment of time window is divided into several small time units at equal intervals, where one small time unit has a length of n, and the sliding window moves forward by a small time unit per one small time unit n. At the same time, the number of requests processed in one sliding window is certain, and access requests that exceed the number of access requests processed within one sliding window will be subject to access traffic limiting. For example, if the size of a segment of time window is set to be 60 seconds, and the time window is divided into 4 small time units, each small time unit is 15 seconds, the number of access requests to the access interface within any 60-second sliding window cannot be greater than 1000. If 1000 requests come in concurrently, in a first 60-second time window, when 1000 access requests burst in a 15-second small time unit, the threshold for the server to process has been exceeded at this point, then a new merging access request will be denied from service, queuing, or waiting; and after 15 seconds, the sliding window moves forward by a small cell so that once-again reception of new 1,000 requests is possible.

Further, 1000 requests can also be split, and enter into the sliding window in batches. For example, in the first 60-second time window, 400 access requests enter in within a 15-second small time unit while 600 access requests enter in within a 45-second small time unit, then once-again reception of 400 access requests is possible after 15 seconds when the sliding window moves forward by a small time unit. And so on, the process of receiving a new request within a sliding window can be implemented.

Exemplarily, intercepting, outside the access interface, the target access request transmitted by the terminal device may be: acquiring interface configuration information of the access interface when it is detected that the terminal device transmits the target access request to the access interface; determining whether the interface configuration information includes traffic-limiting configuration information; and intercepting the target access request outside the access interface if the interface configuration information includes the traffic-limiting configuration information.

Before intercepting, outside the access interface, the target access request transmitted by the terminal device, it is necessary to first acquire configuration information of the access interface and determine whether the configuration information of the access interface contains traffic-limiting configuration information, thereby deciding whether to perform access traffic limiting.

Figure 5:
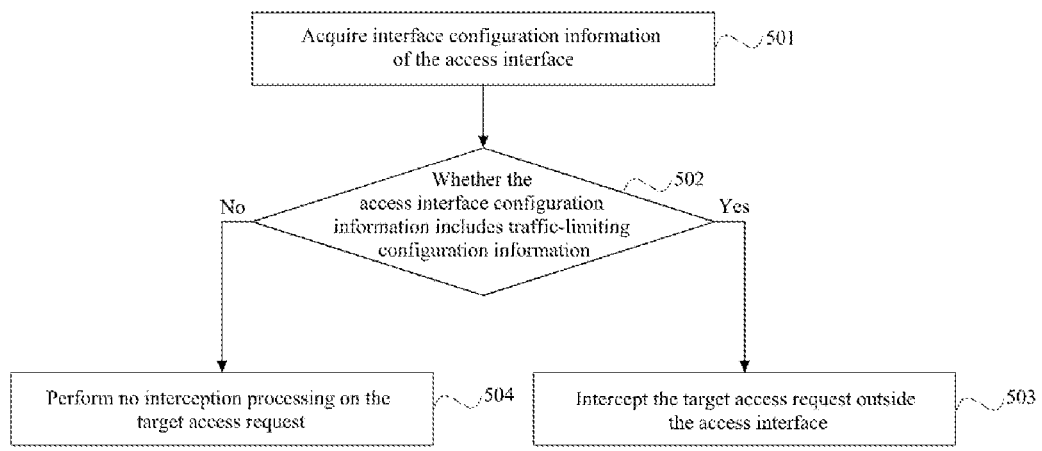
FIG. 5 is a flowchart of a method about whether to perform traffic limiting to an access interface according to an embodiment of the present application.

Specifically, FIG. 5 can be used to illustrate whether it is necessary to perform traffic limiting on the access interface. The specific process is as follows.

Step 501: acquire access interface configuration information of the access interface.

Step 502: determine that whether the access interface configuration information includes traffic-limiting configuration information.

Step 503: intercept the target access request outside the access interface if the access interface configuration information includes the traffic-limiting configuration information.

Step 504: perform no interception processing on the target access request if the access interface configuration information does not include the traffic-limiting configuration information.

Specifically, the configuration information in the access interface is configuration contained in the access interface, for example, the access interface configuration information contains traffic-limiting configuration information. Before intercepting the target access request outside the access interface, it is necessary to first determine whether the access interface contains traffic-limiting configuration information, and if it contains the traffic-limiting configuration information, for each individual terminal device, outside the access interface, the target access request transmitted by the terminal device is intercepted.

In the present embodiment, before applying to intercept the access request, it is checked that whether the traffic-limiting configuration information is contained in the configuration information of the access interface, and early confirmation is possible with regard to whether the access interface contains a traffic limiting method, thereby ensuring the stability of the system.

Step 202: determining the number of times that the target access request is received within a preset time period.

The preset time period generally includes a sliding time window.

Exemplarily, when a user accesses the interface through the terminal device, the server, after receiving the target access request transmitted by the terminal device, will determine the number of times that the target access request is received within the above-described preset time period. The number of times the server receives the target access request within the preset time period can also be interpreted as the number of times the terminal device transmits the target access request to the server within the preset time period. The server can obtain the number of times for the target access request locally or from a traffic limiting server.

Further, in order to improve the success rate of accessing by each individual user, after intercepting the target access request, the server can also determine whether the target access request is a non-first-access request to the interface, and then determine the number of times that the target access request is received within the preset time period if the target access request is the non-first-access request to the access interface; and transmit the target access request to the access interface if the target access request is the first-access request to the access interface.

Specifically, if the user transmits the target access request through the terminal device to access the access interface for the first time, the server will create an independent sliding window corresponding to the user, and request to pass through a traffic limiting component before accessing the access interface, where the traffic limiting component can directly release the target access request according to an internally added traffic limiting method or rule, so that a once-access to the above-described access interface is made for the target access request. In the following set segment of time period, if the user continues to transmit an access request through the terminal device, the user's access request at this point is a non-first-access request to the access interface. First, if there is insufficient request processing capacity in the sliding window, the request will be denied directly; and if there is sufficient request processing capacity in the sliding window, a counter will be started to count the number of access requests to the access interface within the preset time after the request is received.

Further, after counting the number of access requests to access the access interface within the preset time in the sliding window, the traffic limiting component can determine, based on the counted number, whether to release the target access request to access the interface.

In the present embodiment, for the received target access request, the determination on whether it is a first-access request to the access interface may ensure that each individual user can successfully access the access interface in the case of concurrent requests simultaneously by a plurality of users, protecting the system from being blocked due to frequent transmission of an access request from an individual user so that the system denies all access requests by means of traffic limiting, thereby further improving the success rate of accessing by the user and enhancing user experience.

Step 203: transmit the target access request to the access interface if the number of times is greater than a second preset value.

The second preset value refers to a maximum number of interface accesses within the preset time period set by the traffic limiting method or rule contained in the traffic limiting component, and its value can be set according to the actual situation or experience. For a specific value of the second preset value, the embodiments of the present application do not impose any limitation herein.

Exemplarily, a server receives and processes access requests transmitted by terminal devices, and the server's ability to handle concurrent access requests is measured by the throughput rate, so any server has a threshold for its ability to handle concurrent access requests. In order to ensure the stable operation of the system and ensure that each user can successfully access the access interface in the case of a large number of concurrent access requests, a second preset value in the sliding window can be set according to the traffic limiting method or rule set in the traffic limiting component.

Further, when the user makes a non-first-request to access the interface, the number of times that the target access request is received in the preset time period is counted. When the number of times that the target access request is received in the preset time period exceeds the second preset value, the traffic limiting component executes a release rule, so that a once-access to the access interface is made for the target access request. That is, the server will transmit the target access request to the access interface, and meanwhile reset or update the number of times that the target access request is received in the sliding window, in this way, it can be ensured that the system is protected from traffic limiting since the user will not repeatedly calling the access interface after successfully accessing the access interface, thereby further improving the success rate of accessing by each individual user and saving system resources.

The access interface from receiving the target access request is prohibited when the number of times that the target access request is received within a segment of sliding time window is not greater than the second preset value, that is, the access to the access interface for the target access request is intercepted, a degrading method executed, and the number of times that the target access request is received is increased by one. To be noted, if the number of requests from the target access request to the access interface still does not exceed the second preset value after the set sliding time window is expired, the access request in the sliding window is deleted.

The degrading method is to specify access requests at different levels, and perform different processing when confronted with different abnormal levels. Depending on service modes: a service can be denied, a service can be delayed, and sometimes a service can be randomized.

Furthermore, sliding windows that have been used will always exist in system resources, and in order to protect the system resources, it is necessary to destroy unwanted sliding windows. For example, when it is determined that a sliding window has not been used for a long time, a custom event is transmitted to a custom spring event monitor, and the monitor is responsible for removing the sliding window instance.

The access traffic limiting method and apparatus, the device, the storage medium and the computer program product provided in the embodiments of the present application allow for: when detecting that the number of access requests transmitted by a plurality of terminal devices to an access interface exceeds a first preset value, intercepting for each individual terminal device, outside the access interface, a target access request transmitted by the terminal device; then determining the number of times that the target access request is received within a preset time period; and transmitting the target access request to the access interface if the number of times is greater than a second preset value. In a scenario of a large number of concurrent access requests, a traffic limiting component will be provided outside the access interface for each individual terminal device, and the target access request transmitted by the terminal device will be intercepted by the traffic limiting method. If the number of times that the target access request is received within the preset time exceeds the second preset value, it indicates that a user is in an urgent need to access the access interface; at this point, the traffic limiting component will release the access request to call the access interface. In this way, the system can be prevented from denying all access requests by enabling traffic limiting due to frequent transmission of an access request from an individual, thereby improving the success rate of accessing by the user under the premise of stable operation of the system.

Figure 6:
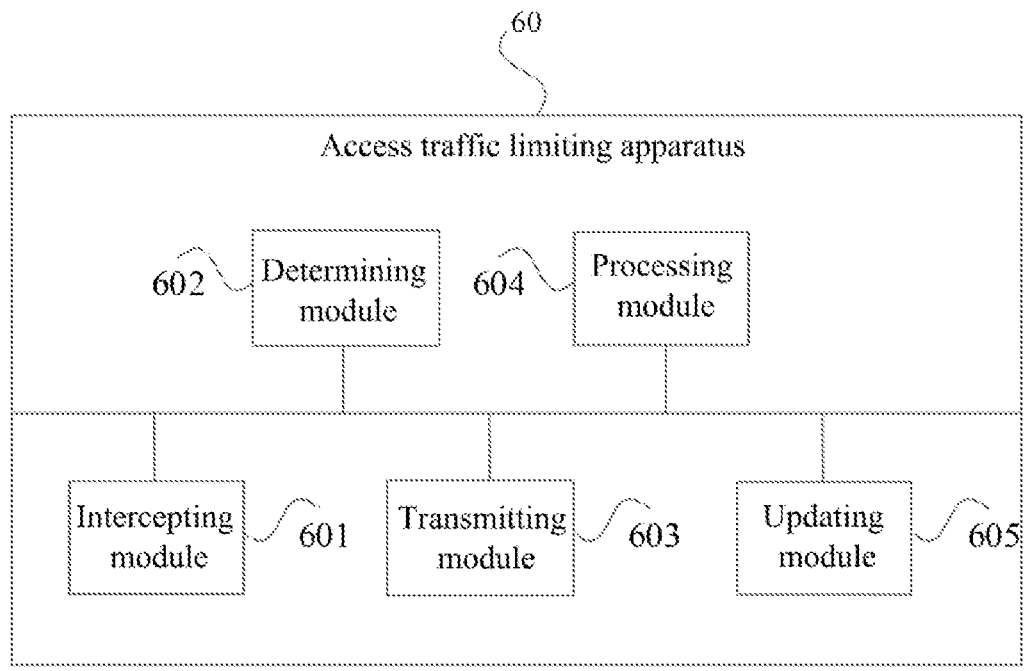
FIG. 6 is a schematic structural diagram of an access traffic limiting apparatus according to an embodiment of the present application.

FIG. 6 is a schematic structural diagram of an access traffic limiting apparatus 60 according to an embodiment of the present application. Exemplarily, with reference to FIG. 6, the access traffic limiting apparatus 60 may include:

an intercepting module 601, configured to, when detecting that the number of access requests transmitted by a plurality of terminal devices to an access interface exceeds a first preset value, intercept for each individual terminal device, outside the access interface, a target access request transmitted by the terminal device;

a determining module 602, configured to determine the number of times that the target access request is received within a preset time period; and a transmitting module 603, configured to, transmit the target access request to the access interface when the number of times is greater than a second preset value.

In a possible implementation, the determining module 602 is specifically configured to:

determine whether the target access request is a non-first-access request to the access interface; and determine the number of times that the target access request is received within the preset time period if the target access request is the non-first-access request to the access interface.

In a possible implementation, the transmitting module 603 is specifically configured to:

transmit the target access request to the access interface if the target access request is a first-access request to the access interface.

In a possible implementation, the apparatus further includes: a processing module 604;

where the processing module 604 is configured to prohibit the access interface from receiving the target access request when the number of times is not greater than the second preset value.

In a possible implementation, the apparatus further includes: an updating module 605;

where the updating module 605 is configured to update the number of times that the target access request is received.

In a possible implementation, the intercepting module 601 is specifically configured to:

acquire interface configuration information of the access interface;

determine whether the interface configuration information includes traffic-limiting configuration information; and intercept the target access request outside the access interface if the interface configuration information includes the traffic-limiting configuration information.

The access traffic limiting apparatus 60 provided in the embodiment of the present application can execute the technical solution of the access traffic limiting method in any of the foregoing embodiments, and is implemented using the similar principles and produces the similar beneficial effect to the implementation principle and the beneficial effect of the access traffic limiting method. Reference may be made to the implementation principle and the beneficial effect of the access traffic limiting method, and details will not be elaborated here.

Figure 7:
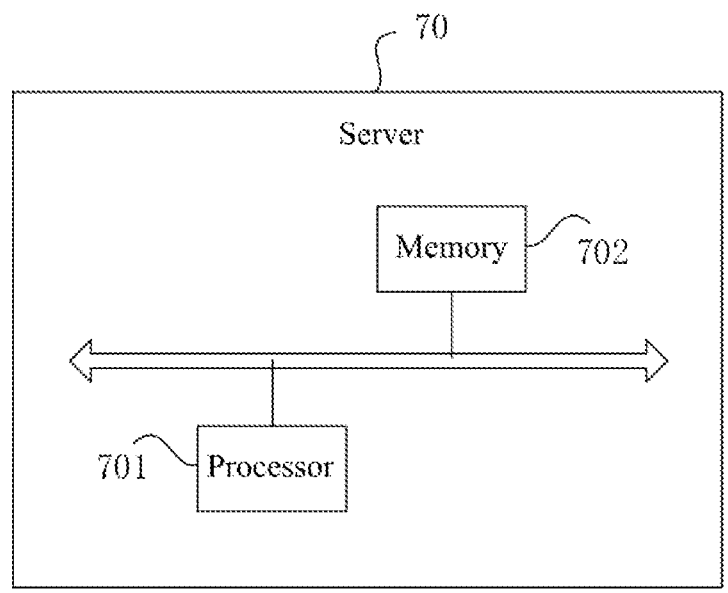
FIG. 7 is a schematic structural diagram of a server according to an embodiment of the present application.

FIG. 7 is a schematic structural diagram of a server 70 according to an embodiment of the present application. Exemplarily, with reference to FIG. 7, the server may include a processor 701 and a memory 702.

The memory 702 is configured to store a computer program.

The processor 701 is configured to read the computer program stored in the memory 702 and execute the technical solution of the access traffic limiting method according to any one of the foregoing embodiments based on the computer program in the memory 702.

Optionally, the memory 702 may be stand-alone or integrated with the processor 701. When the memory 702 is a device independent of the processor 701, the server may also include: a bus, for connecting the memory 702 and the processor 701.

Optionally, the present embodiment further includes: a communication interface which may be connected to the processor 701 via a bus. The processor 701 can control the communication interface to implement acquiring and transmitting functions of the above-described server.

The server shown in the embodiment of the present application can execute the technical solution of the access traffic limiting method in any of the foregoing embodiments, and is implemented using the similar principles and produces the similar beneficial effect to the implementation principle and the beneficial effect of the access traffic limiting method. Reference may be made to the implementation principle and the beneficial effect of the access traffic limiting method, and details will not be elaborated here.

An embodiment of the present application further provides a computer-readable storage medium in which a computer-executable instruction is stored, where the computer-executable instruction, when executed by a processor, is configured to implement the technical solution of the access traffic limiting method according to any one of the forgoing embodiments.

An embodiment of the present application further provides a computer program product, including: a computer program which, when executed by a processor, implements the technical solution of the access traffic limiting method according to any one of the forgoing embodiments. It is implemented using the similar principles and produces the similar beneficial effect to the implementation principle and the beneficial effect of the access traffic limiting method. Reference may be made to the implementation principle and the beneficial effect of the access traffic limiting method, and details will not be elaborated here.

In several embodiments provided in the present application, it should be understood that the disclosed apparatus and method may be implemented in other manners. For example, the described apparatus embodiments are merely exemplary. For example, the division of units is merely division of logical functions and there may be other divisions in actual implementations. For example, a plurality of units or components may be combined or integrated into another system, or some features may be ignored or not be performed. In addition, the mutual couplings or direct couplings or communication connections displayed or discussed herein may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, they may be located in one position, or may be distributed on a plurality of network units. A part or all of the units may be selected according to actual needs to achieve the objections of the solutions of the embodiments. In addition, functional units in the embodiments of the present application may be integrated into one processing unit, or each of the units may exist alone physically, or two or more units may be integrated into one unit. The integrated unit may be implemented in a form of hardware, or may be implemented in a form of a hardware plus software functional unit.

The integrated module implemented in a form of a software functional module can be stored in a computer-readable storage medium. The described software functional module is stored in a storage medium, and includes several instructions enabling a computer device (which may be a personal computer, a server, a network device, or the like) or a processor to perform part of the steps of the method described in the embodiments of the present application.

It should be understood that the described processor can be a central processing unit (CPU), or the other general-purpose processor, a digital signal processor (DSP), an application specific integrated circuit (ASIC), etc. The general-purpose processor can be a microprocessor or the processor can also be any conventional processor. The steps of the method disclosed in combination with the present application can be directly reflected in the completion of execution by the hardware processor or the combination of hardware and software modules in the processor.

The memory may include a high-speed RAM memory, or a non-volatile memory (NVM), such as at least one disk memory, a USB flash disk, a mobile hard disk, a read-only memory, a magnetic disk, an optical disk, or the like.

The bus can be an industry standard architecture (ISA) bus, a peripheral component interconnect (PCI) bus or an extended industry standard architecture (EISA) bus, etc. The bus can be classified as an address bus, a data bus, a control bus, etc. For ease of representation, the bus in the accompanying drawings of the present application is not limited to only one bus or one type of buses.

The described computer-readable storage medium can be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium can be any available medium that can be accessed by a general-purpose or dedicated computer.

Finally, it should be noted that the foregoing embodiments are merely intended for describing the technical solutions of the present application rather than limiting the present application. Although the present application has been described in detail with reference to the foregoing embodiments, persons of ordinarily skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. An access traffic limiting method, comprising:
   when detecting that the number of access requests transmitted by a plurality of terminal devices to an access interface exceeds a first preset value, intercepting for each individual terminal device, outside the access interface, a target access request transmitted by the terminal device;
   determining the number of times that the target access request is received within a preset time period, wherein the preset time period comprises a sliding time window;
   wherein detecting the access requests transmitted by the plurality of terminal devices to the access interface comprises: creating an isolative sliding time window for each different individual terminal device, dividing a segment of the time window into a plurality of cells, each having equal time intervals, maintaining a respective counter in each cell of the number of requests received from each different individual terminal device, and when the time interval of a cell is reached, moving the sliding window forward to the next cell;

wherein an access request within the sliding window passes through a traffic limiting component, wherein the traffic limiting component contains a set of access traffic limiting methods and rules; and the traffic limiting component determines, according to an access traffic limiting method and rule inside, and the respective access request counter for the individual terminal device whether to release the target access request to call the access interface, wherein the determining the number of times that the target access request is received within the preset time period comprises:

determining whether the target access request is a non-first-access request to the access interface from the individual terminal device;

transmitting the target access request to the access interface if the target access request is a first-access request to the access interface;

determining the number of times that the target access request is received within the preset time period if the target access request is the non-first-access request to the access interface transmitting the target access request to the access interface if the number of times is greater than a second preset value and prohibiting the access interface from receiving the target access request if the number of times is not greater than the second preset value.

2. The method according to claim 1, after transmitting the target access request to the access interface, further comprising:

updating the number of times that the target access request is received.

3. The method according to claim 1, wherein the intercepting, outside the access interface, the target access request transmitted by the terminal device comprises:

acquiring interface configuration information of the access interface;

determining whether the interface configuration information comprises traffic-limiting configuration information;

intercepting the target access request outside the access interface if the interface configuration information comprises the traffic-limiting configuration information.

4. An access traffic limiting apparatus, comprising: a processor; a communication interface connected with the processor; a memory connected with the processor and configured to store computer instructions that when executed by the processor enables the processor to:

when detecting that the number of access requests transmitted by a plurality of terminal devices to an access interface exceeds a first preset value, intercepting for each individual terminal device, outside the access interface, a target access request transmitted by the terminal device;

determine the number of times that the target access request is received within a preset time period, wherein the preset time period comprises a sliding time window;

wherein detecting the access requests transmitted by the plurality of terminal devices to the access interface comprises: creating an isolative sliding time window for each different individual terminal device, dividing a segment of the time window into a plurality of cells, each having equal time intervals, maintaining a respective counter in each cell of the number of requests received from each different individual terminal device, and when the time interval of a cell is reached, moving the sliding window forward to the next cell;

wherein an access request within the sliding time window passes through a traffic limiting component, wherein the traffic limiting component contains a set of access traffic limiting methods and rules and the traffic limiting component determines, according to an access traffic limiting method and rule inside, and the number of requests received from the individual terminal device whether to release the target access request to call the access interface, when determining the number of times that the target access request is received within the preset time period, the processor is configured to:

determine whether the target access request is a non-first-access request to the access interface;

transmit, through the communication interface, the target access request to the access interface if the target access request is a first-access request to the access interface determine the number of times that the target access request is received within the preset time period if the target access request is the non-first-access request to the access interface;

transmit, through the communication interface, the target access request to the access interface when the number of times is greater than a second preset value; and prohibit the access interface from receiving the target access request if the number of times is not greater than the second preset value.

5. The access traffic limiting apparatus according to claim 4, wherein after transmitting the target access request to the access interface, the computer program further enables the processor to:

update the number of times that the target access request is received.

6. The access traffic limiting apparatus according to claim 4, wherein the computer program further enables the processor to:

acquire interface configuration information of the access interface;

determine whether the interface configuration information comprises traffic-limiting configuration information;

intercept the target access request outside the access interface if the interface configuration information comprises the traffic-limiting configuration information.

7. A non-transitory computer-readable storage medium storing computer-executable instructions that when executed by a processor, implement an access traffic limiting method, comprising:

when detecting that the number of access requests transmitted by a plurality of terminal devices to an access interface exceeds a first preset value, intercepting for each individual terminal device, outside the access interface, a target access request transmitted by the terminal device;

determining the number of times that the target access request is received within a preset time period, wherein the preset time period comprises a sliding time window;

wherein detecting the access requests transmitted by the plurality of terminal devices to the access interface comprises: creating an isolative sliding time window for each different individual terminal device, dividing a segment of the time window into a plurality of cells, each having equal time intervals, maintaining a respective counter in each cell of the number of requests received from each different individual terminal device, and when the time interval of a cell is reached, moving the sliding window forward to the next cell;

wherein an access request within the sliding window passes through a traffic limiting component, wherein the traffic limiting component contains a set of access traffic limiting methods and rules and the traffic limiting component determines, according to the access traffic limiting method and rule, and the number of access requests received from the individual terminal device, whether to release the target access request to call the access interface;

wherein the determining the number of times that the target access request is received from the individual terminal device, within the preset time period comprises:

determining whether the target access request is a non-first-access request to the access interface;

transmitting the target access request to the access interface if the target access request is a first-access request to the access interface;

determining the number of times that the target access request is received within the preset time period if the target access request is the non-first-access request to the access interface;

transmitting the target access request to the access interface when the number of times is greater than a second preset value; and prohibiting the access interface from receiving the target access request if the number of times is not greater than the second preset value.

* * * * *